(12) United States Patent
Namikata (10) Patent No.: US 7,746,504 B2
(45) Date of Patent: Jun. 29, 2010

(54) IMAGE FORMING APPARATUS AND METHOD WHICH PERFORM SMOOTHING PROCESSING

(75) Inventor: Takeshi Namikata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1347 days.

(21) Appl. No.: 11/083,938

(22) Filed: Mar. 21, 2005

(65) Prior Publication Data

US 2005/0213160 A1    Sep. 29, 2005

(30) Foreign Application Priority Data

Mar. 26, 2004  (JP)  .............................. 2004-093161

(51) Int. Cl.
*H04N 1/409*  (2006.01)
(52) U.S. Cl. .................... 358/3.27; 358/1.9; 382/266; 382/269
(58) Field of Classification Search ................. 358/1.9, 358/3.27, 540, 521; 382/269, 266, 264; 347/131
See application file for complete search history.

(56) References Cited

U.S. PATENT DOCUMENTS 4,860,026 A * 8/1989 Matsumoto et al. .......... 347/15
5,946,454 A * 8/1999 Shu et al. ..................... 358/1.9
7,164,498 B2 * 1/2007 Van Bael ..................... 358/1.9

FOREIGN PATENT DOCUMENTS

| JP | 10-42141 | 2/1989 |
|----|----------|--------|
| JP | 08-018785 | 1/1996 |
| JP | 08-317210 | 11/1996 |
| JP | 10-181000 | 7/1998 |
| JP | 2894137 | 3/1999 |
| JP | 2001-290319 | 10/2001 |
| JP | 2001-318499 | 11/2001 |
| JP | 2004-093643 | 3/2004 |

* cited by examiner

*Primary Examiner*—King Y Poon
*Assistant Examiner*—Jamares Washington
(74) *Attorney, Agent, or Firm*—Fitzpatrick, Cella, Harper & Scinto (57) ABSTRACT

An image forming apparatus which performs image formation using plural color materials including dark color material and light color material for a hue generates color component signals corresponding to the respective plural color materials from an input image signal. Edge smoothing processing is performed on the respective color component signals except a color component signal corresponding to the light color material.

5 Claims, 11 Drawing Sheets

IMAGE FORMING APPARATUS AND METHOD WHICH PERFORM SMOOTHING PROCESSING

FIELD OF THE INVENTION

The present invention relates to an image forming apparatus used in a copier, a printer, a facsimile machine (hereinbelow, abbreviated to "FAX") and the like, and more particularly, to image processing in an image forming apparatus which performs image formation using plural recording materials (ink or toner) of different densities in the same or similar color hue.

BACKGROUND OF THE INVENTION

Needs of the marketplace for printers are increased every year. Regarding color image formation, a 4-color image forming apparatus using 4 color ink or toner is popular, however, image forming apparatuses using increased number of colors of ink or toner have been proposed and realized. For example, an ink-jet printer which performs image formation using 6 inks including light cyan and light magenta inks as well as conventional cyan, magenta, yellow and black inks for the purpose of mitigation of graininess has been realized. Further, an electrophotographic printer using 6 colors as in the case of the ink-jet printer has been proposed (Japanese Patent Application Laid-Open Nos. 2001-290319 and 2001-318499). Additionally, an electrophotographic printer using green and orange inks for enlargement of color gamut has been proposed and realized. Further, a printer which performs image formation using ink toner corresponding to special colors such as red, blue, green or gold, silver and fluorescent colors has been proposed and realized.

In this manner, various types of image forming apparatuses using increased number of ink/toner colors are known, however, in these apparatuses, the use of increased number of ink/toner colors is intended for improvement in color reproducibility of an image output device itself.

On the other hand, edge smoothing is known as disclosed in Japanese Patent Application Laid-Open No. 08-317210. Edge smoothing is an image processing technique mainly used in electrophotographic printers. In this technique, an edge included in an image signal is detected, and the edge portion or edge-adjacent portion is replaced with halftone dots, thereby jaggies on character and thin line images are reduced, and smoothed edges are reproduced on a paper medium.

The edge smoothing technique performs independent processing for each color channel in the conventional 4-color (CMYK) image forming apparatus. To apply the edge smoothing technique to the above-described image forming apparatus using the dark and light color recording materials, a circuit to realize smoothing processing is provided for the respective color recording materials. Accordingly, smoothing processing is performed on even light color signals. However, the application of smoothing processing to a light color signal, where edge portions are not conspicuous, does not greatly improve the image quality, but increases the circuit scale, thus increases the costs of the apparatus.

Particularly, in the electrophotographic image forming apparatuses, there is a close correspondence between the size of a dot to be formed and the stability in dot formation. That is, when a large dot is formed so as to obtain a higher density, the stability of dot formation is increased, while when a small dot is formed so as to obtain a low density, the stability of dot formation is lowered (becomes unstable). As dots added to an edge portion in the edge smoothing processing are intermediate density dots, the stability of the dots are lower than full dots.

SUMMARY OF THE INVENTION

Accordingly, the present invention has an object to address the problems in application of the edge smoothing technique to an image forming apparatus using dark and light recording materials. More particularly, the object of the present invention is to enable cost reduction while maintaining effective edge smoothing.

Further, another object of the present invention is to stabilize formation of halftone dots caused by edge smoothing processing, thereby improving image quality.

According to an aspect of the present invention to attain the above objects, provided is an image forming apparatus comprising: an image forming unit configured to perform image formation using plural color materials including dark color material and light color material for a hue; a generation unit configured to generate color component signals corresponding to the respective plural color materials from an input image signal; and a smoothing unit configured to perform edge smoothing processing on the respective color component signals, except a color component signal corresponding to the light color material, generated by the generation unit.

Further, according to another aspect of the present invention to attain the above objects, provided is an image forming apparatus comprising: an image forming configured to perform image formation using plural color materials including dark color material and light color material for a hue; a generation unit configured to generate color component signals corresponding to the respective plural color materials from an input image signal; a smoothing unit configured to perform edge smoothing processing on the respective color component signals generated by the generation unit; and a conversion unit configured to convert a halftone color component signal, generated by the edge smoothing processing on a color component signal corresponding to the dark color material, into a color component signal corresponding to the light color material for a hue of the dark color.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

<Construction of Image Forming Apparatus>

Figure 1:
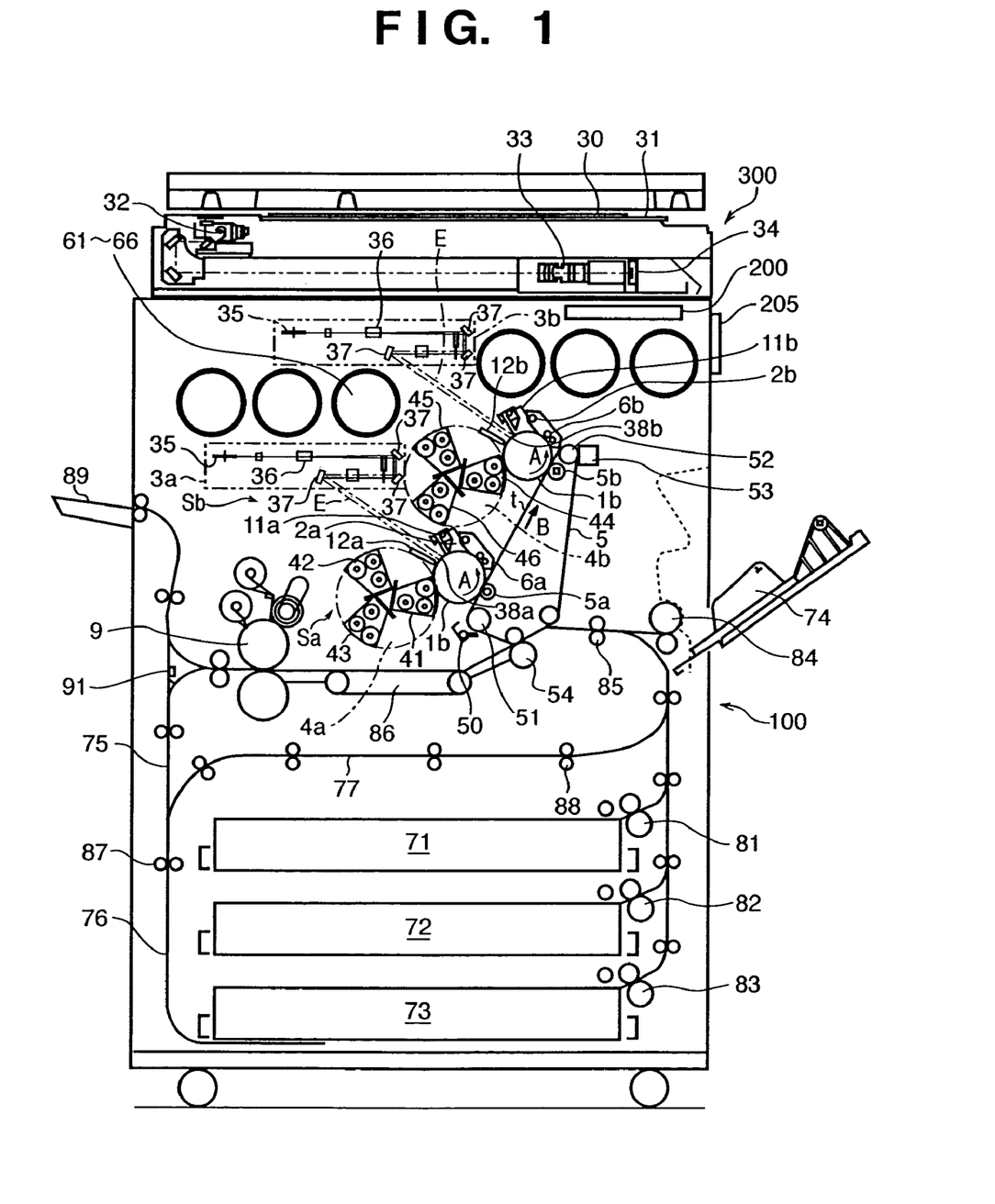
FIG. 1 is a schematic cross-sectional view showing an example of the construction of an image forming apparatus according to a first embodiment.

FIG. 1 is a schematic cross-sectional view of a full-color image forming apparatus (in this embodiment, a multifunction apparatus having a copy function, a printer function and a FAX function) according to a first embodiment. In the present embodiment, the apparatus has a digital color image reader 300 in a upper part and a digital color image printer 100 in a lower part.

In the reader 300, an original 30 placed on an original glass plate 31 is exposure-scanned by an exposure lamp 32. A reflected light image from the original 30 is collected via a lens 33 on a full-color CCD sensor 34, and color separation image signals are obtained. The color separation image signals are subjected to processing by a video processing unit (not shown) through an amplifier circuit (not shown), and outputted to the printer 100 via an image memory (not shown).

In addition to the signals from the reader 300, image signals from a computer and a FAX are transmitted to the printer 100. Next, an operation of the printer 100 related to the signal from the reader 300 as a representative signal will be described.

The printer 100 briefly has two image forming units, i.e., a first image forming unit Sa including a first photosensitive drum 1a, and a second image forming unit Sb including a second photosensitive drum 1b. The image forming units Sa and Sb have approximately the same construction (shape) for the purpose of cost reduction. For example, the construction and the shape of developers to be described later are approximately the same. The printer 100 is operative even if some of developers 41 to 46 are exchanged between the image forming units.

The two drum-shaped photosensitive members (photosensitive drums) as image holders, i.e., the first photosensitive drum 1a and the second photosensitive drum 1b, are respectively supported rotatably in arrow A direction in FIG. 1. Preexposure lamps 11a and 11b, corona chargers (charging means) 2a and 2b, first exposure means 3a as a laser exposure optical system, second exposure means 3b, potential sensors 12a and 12b, moving members as rotary developer holders (developing rotaries) 4a and 4b which have respectively three developers 41 to 42 and 44 to 46 containing developing materials in different colors in their respective holders, primary transfer rollers 5a and 5b as primary transfer means, and cleaning units 6a and 6b, are arranged around the respective photosensitive drums 1a and 1b.

Further, the number of developers is five or more for obtaining high image quality. In the present embodiment, six developers 41 to 46 are employed.

The developer 41 is filled with magenta toner; the developer 42 is filled with cyan toner; the developer 43 is filled with light magenta toner; the developer 44 is filled with yellow toner; the developer 45 is filled with black toner; and the developer 46 is filled with light cyan toner.

The dark and light developing materials are generated by changing the amount of pigments of the same equal spectral characteristics. Accordingly, in the light magenta toner, the spectral characteristic of the pigment is the same as that of the magenta toner, but the content of the pigment is smaller than that of the magenta toner. Also, in the light cyan toner, the spectral characteristic of the pigment is the same as that of the cyan toner, but the content of the pigment is smaller than that of the cyan toner.

Further, it may be arranged such that developers (having the same shape of the above developers) containing toner having pigment spectral characteristics different from those of cyan, magenta, yellow and black toners, e.g., metallic toner such as gold and silver toner and fluorescent color toner including fluorescent agent are mounted in the developing rotaries. Further, the developer is filled with two-component developing material using mixed toner and carrier, however, one-component developing material using only toner may be employed without any problem.

Note that dark and light magenta and cyan colors are used for the purpose of exponential improvement of reproducibility in a light color image representing e.g. human skin (for the purpose of reduction of graininess).

In the laser exposure optical systems 3a and 3b as exposure means, the image signal from the reader 300 is converted to a light signal by a laser output unit (not shown) and outputted as laser light. The laser light E is reflected by a polygon mirror 35, and emitted through a lens 36 and respective reflecting mirrors 37 on exposure positions 38a and 38b on the surface of the photosensitive drums 1a and 1b.

Upon image formation in the printer 100, the photosensitive drums 1a and 1b are rotated in the arrow A direction. During the rotation, the photosensitive drums 1a and 1b are discharged with the preexposure lamps 11a and 11b, then uniformly charged with the chargers 2a and 2b. The laser light E corresponding to each image of separated color is emitted on the uniformly charged photosensitive drums 1a and 1b, thereby latent images are formed on the photosensitive drums 1a and 1b.

Next, the rotary developer holders as moving members, i.e., the first developing rotary 4a and the second developing rotary 4b are rotated, and one of the developers 41 to 43 and one of the developers 44 to 46 are respectively moved to developing positions on the photosensitive drums 1a and 1b. For example, the developer 41 and the developer 44 are respectively moved to the developing positions on the photosensitive drums 1a and 1b. Then, the developers 41 and 44 are actuated, to reverse-develop the latent images on the photosensitive drums 1a and 1b to form developing material images (toner images) with resin and pigment as base substances on the photosensitive drums 1a and 1b. At this time, a developing bias is applied to the developers.

Further, as shown in FIG. 1, toner containers (hoppers) 61 to 66 for respective colors are provided between and beside the laser exposure optical systems 3a and 3b. The developers 41 to 46 are supplied with toner from these hoppers 61 to 66 at desired timing so as to maintain a constant toner ratio (toner amount) in the developers.

The toner images formed on the respective photosensitive drums 1a and 1b are sequentially primary-transferred onto an intermediate transfer member (intermediate transfer belt) 5 as a transfer medium such that the toner images are overlaid, by the primary transfer rollers 5a and 5b as respective primary transfer means. At this time, a primary transfer bias is applied to the primary transfer rollers 5a and 5b. As a result, the respective toner images are sequentially overlay-transferred onto the intermediate transfer belt 5, thus a full color toner image is formed.

Thereafter, the full color toner image on the intermediate transfer belt 5 as a transfer medium is secondary-transferred at once onto a paper sheet as a recording medium. At this time, a secondary transfer bias is applied to a secondary transfer roller 54.

The intermediate transfer belt 5 is driven with a driving roller 51. A transfer cleaning device 50 is provided in an opposite position to the intermediate transfer belt 5 connectably/disconnectably with respect to the driving roller 51. The photosensitive drums 1a and 1b are provided on a transfer surface t as a flat surface portion formed with the intermediate transfer belt 5 stretched by the two rollers 51 and 52. The primary transfer rollers 5a and 5b as primary transfer means are provided in opposite positions to the photosensitive drums 1a and 1b with the intermediate transfer belt 5 therebetween.

One of the rollers 51 and 52 forming the transfer surface t, the roller 52 on the downstream side in a moving direction B of the intermediate transfer belt 5 is a driven roller. A sensor 53 to detect positional shifts and densities of images transferred from the respective drums 1a and 1b is provided in an opposite position to the driven roller 52. Based on the result of detection by the sensor 53, the respective image forming units Sa and Sb are controlled to correct image densities, toner supply amounts, image write timing, image write start position and the like as needed.

Further, the transfer cleaning device 50 is provided in an opposite position to the upstream side driving roller 51. When all the necessary color images have been overlaid on the intermediate transfer belt 5, the images are transferred (secondary-transferred) at once onto the recording medium (paper sheet). After the secondary transfer, the transfer cleaning device 50 is pressed with the opposite driving roller 51, to clear remaining toner on the intermediate transfer belt 5. After the cleaning, the transfer cleaning device 50 moves away from the intermediate transfer belt 5.

On the other hand, the recording medium is conveyed one by one with respective paper feed means 81 to 84 from the respective containers 71 to 73 or a manual feed tray 74. A resist roller 85 corrects skew of the recording medium. The recording medium is conveyed to a secondary transfer portion between the secondary transfer roller 54 and the intermediate transfer belt 5 at desired timing. In the secondary transfer portion, the toner image on the intermediate transfer belt 5 is transferred onto the recording medium.

When the toner image has been transferred onto the recording medium in the secondary transfer portion, the recording medium is supplied through a conveyance portion 86 to a heat roller fixer 9. The heat roller fixer 9 fixes the toner image. Then the recording medium is discharged to a paper discharge tray 89 or a paper postprocessing apparatus (not shown).

On the other hand, the intermediate transfer belt 5 after the secondary transfer is subjected to cleaning by the transfer cleaning device 50 as described above, then used in the primary transfer process by the respective image forming units Sa and Sb again.

Further, in a case where an image is formed on both sides of a recording medium, immediately after the recording medium is passed through the fixer 9, a conveyance path switching guide 91 is driven so as to introduce the recording medium via a conveyance longitudinal path 75 to a reverse path 76. Thereafter, the recording medium is conveyed, by reverse rotation of the reverse roller 87, in an opposite direction to the forward direction, with its rear end in the forward direction as a head in this direction, to a both side conveyance path 77. Then the recording medium is passed through the both side conveyance path 77, then skew correction and timing correction are performed by a both side conveyance roller 88, and the recording medium is conveyed to the resist roller 85 at desired timing. Then, an image is transferred to the other side of the recording medium by the above-described image forming process.

Reference numeral 200 denotes a controller which manages and controls the entire image forming apparatus according to the present embodiment. Numeral 205 denotes an operation unit.

<Constructions of Controller and Image Processor>

Figure 2:
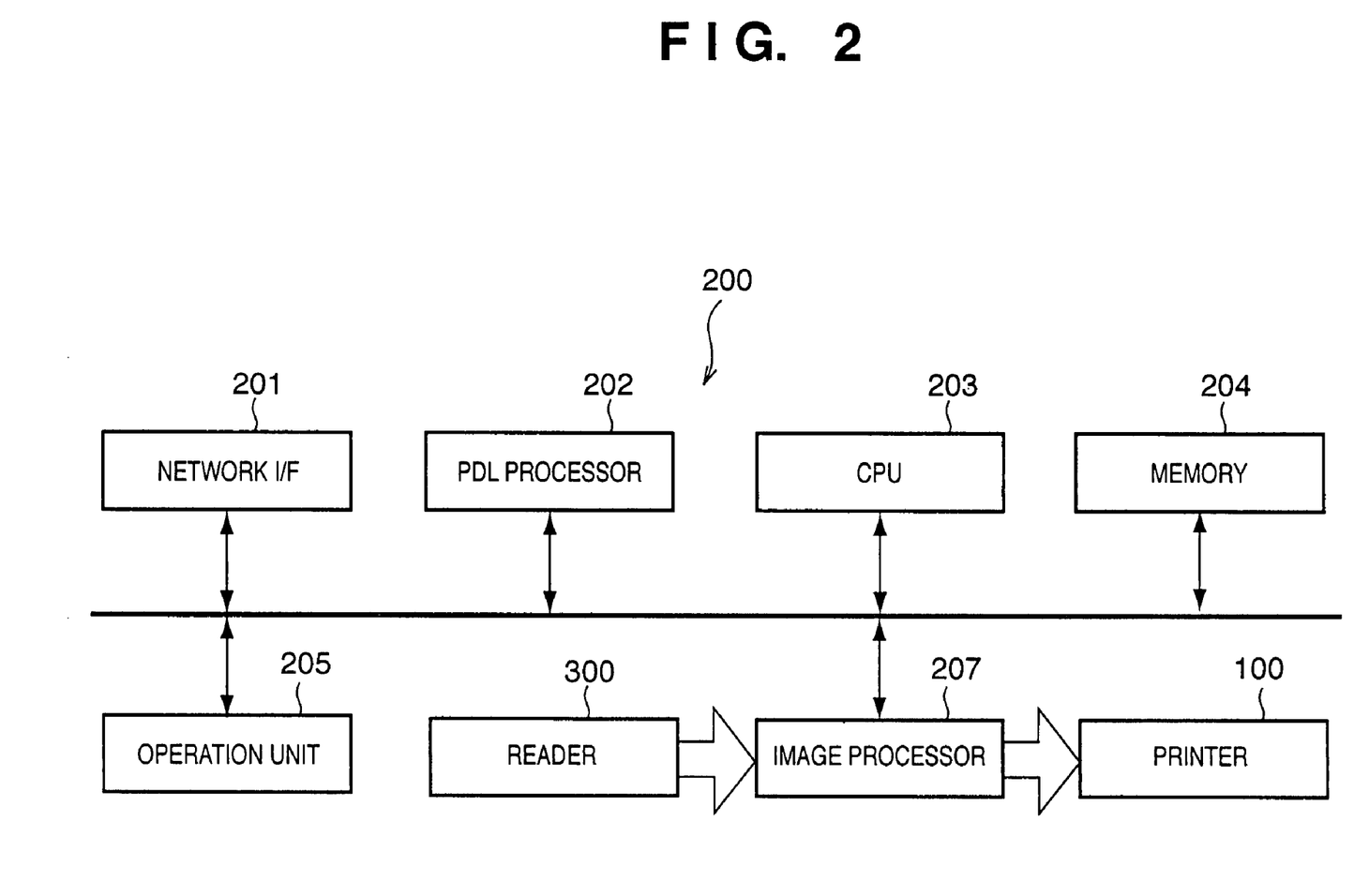
FIG. 2 is a block diagram showing an example of the construction of a controller.

FIG. 2 is a block diagram showing the controller 200 which controls the image forming apparatus shown in FIG. 1. In the controller 200, the operation unit 205 receives an operation instruction to the image forming apparatus from a user, and displays the status of the image forming apparatus. The reader 300 reads an image by the above-described construction, and transmits an image signal to an image processor 207. The image processor 207 performs image processing on the received image signal to obtain an image signal appropriate for output from the printer 100, and transmits the processed image signal to the printer 100. The printer 100, having the above-described construction, forms an image based on the received image signal on a paper medium.

Further, the controller 200 also receives PDL data from an external host computer or the like via a network interface 201. The PDL data received via the network interface 201 is subjected to rendering processing by a PDL processor 202, and sent to the image processor 207. A CPU 203 controls the entire flow of the above-described image processing. Further, a control program to realize the control is stored in a memory 204 (including a RAM and a ROM, and further, may include an external storage device). Note that the controller 200 further includes many other constituent elements such as a FAX receiver, however, the explanations of those other elements will be omitted.

Figure 3:
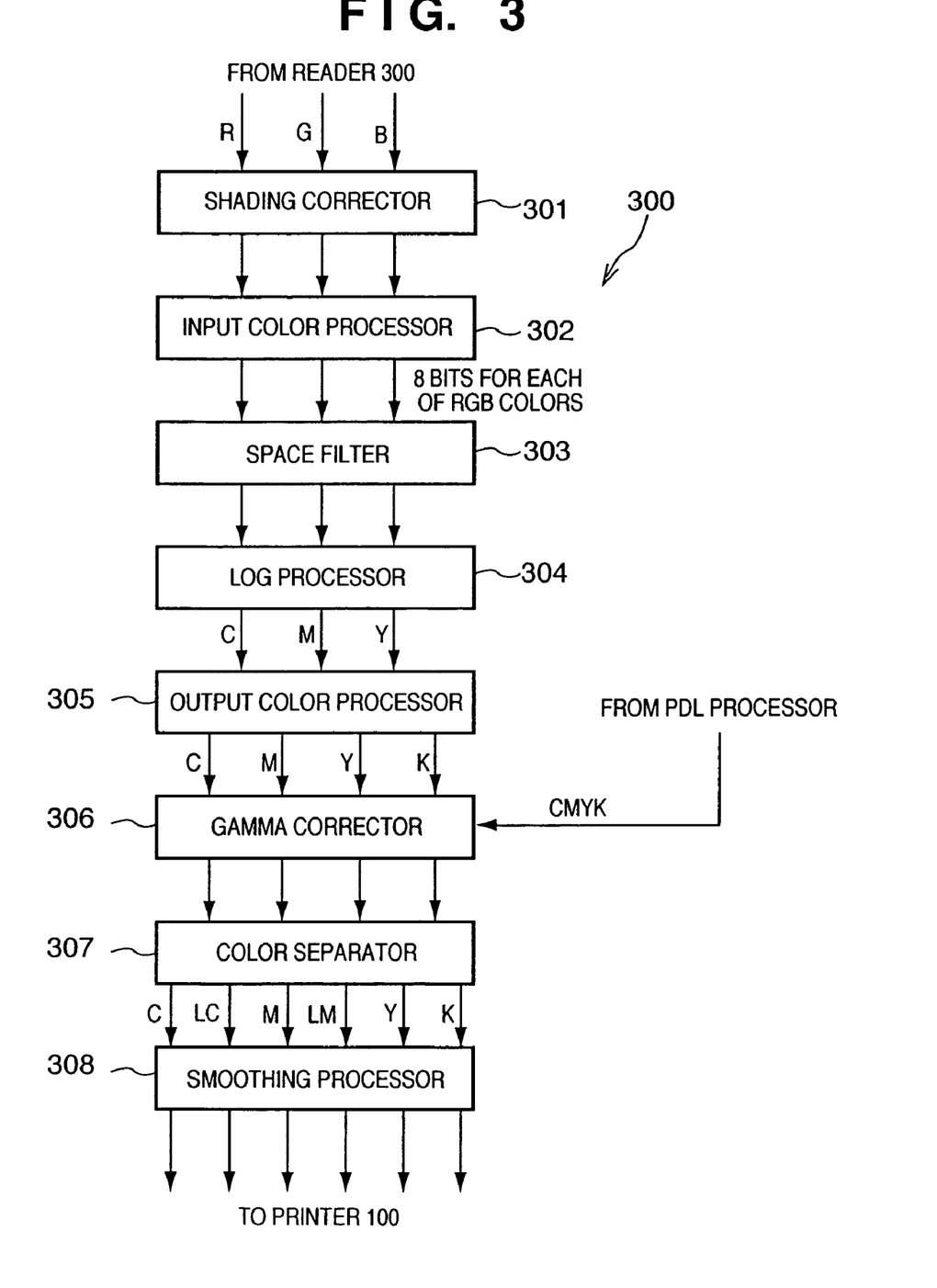
FIG. 3 is a block diagram showing an example of the construction of an image processor.

Next, the details of the image processor 207 will be described with reference to the block diagram of FIG. 3. The reader 300 generates digital image signals from luminance image signals obtained by reading the original 30 using the CCD 34, and inputs the digital image signals into the image processor 207. In the signals, 1 pixel is generally represented with 8 bits (=256 levels). The input RGB signals are subjected to white reference correction by a shading corrector 301, then subjected to input masking processing by an input color processor 302, thereby color turbidity or the like due to the spectral characteristic of the CCD is removed. Next, the frequency characteristics of the input images are corrected by a space filter 303, then CMY signals are obtained by converting the RGB signals as luminance signals to density signals by a LOG processor 304. An output color processor 305 converts the CMY signals, using the well-known output masking and three-dimensional LUT correction operation, to CMYK signals and inputs the CMYK signals into a gamma corrector 306.

The gamma corrector 306 inputs the image signals from the output color processor 205 or CMYK images rendered by the PDL processor 202, and performs gray level correction using a one-dimensional LUT for each color component. Next, a color separator 307 generates image signals appropriate to the image forming apparatus, i.e., a cyan (C) image signal, a light cyan (LC) image signal, a magenta (M) image signal, a light magenta (LM) image signal, a yellow (Y) image signal and a black (K) image signal, from the input CMYK signals. More specifically, the input cyan image signal is separated to cyan and light cyan image signals (C→C, LC), and the input magenta image signal is separated to magenta and light magenta signals (M→M, LM), thereby the 4 color component signals are converted to 6 color component signals. The respective color-separated color signals are inputted into a smoothing processor 308, and the signals through smoothing processing are transmitted to the printer 100.

Note that for the sake of simplicity of explanation, the respective image signals which flow through the image processor 207 are all 8-bit signals having a resolution of 600 dpi. Accordingly, respectively 8-bit 600 dpi C, LC, M, LM, Y and K color component signals are transmitted to the printer 100.

Figure 4:
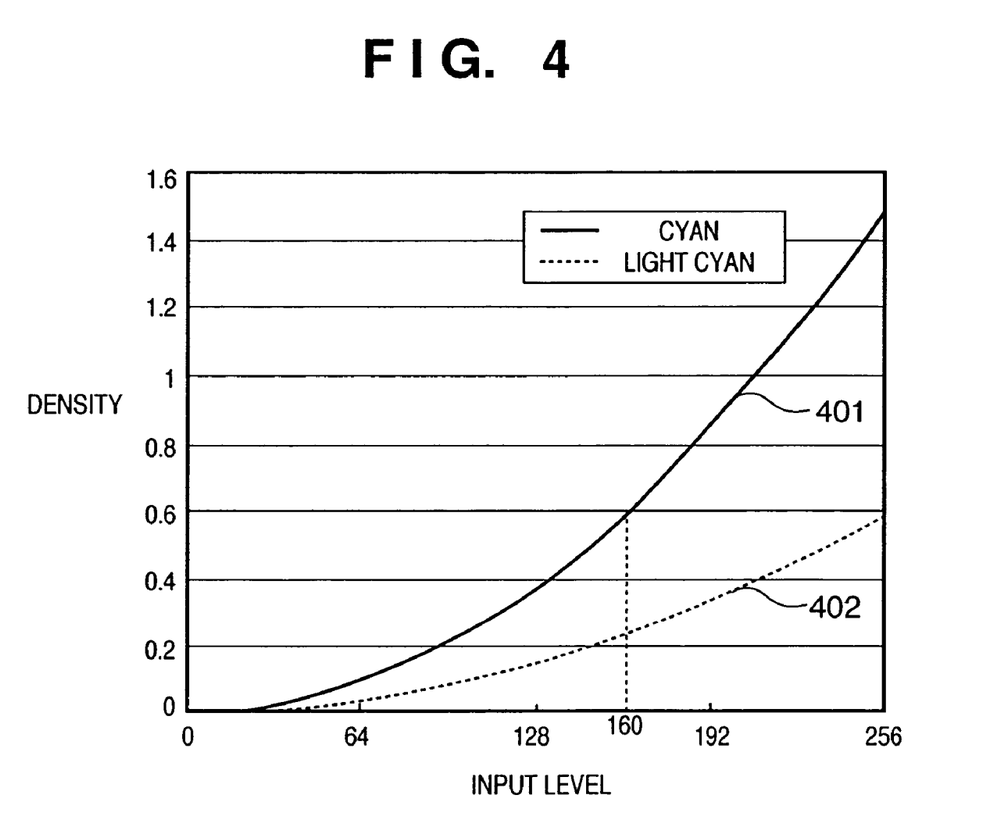
FIG. 4 is a graph showing an example of dark and light toner characteristics (density-signal value characteristic)
Figure 5:
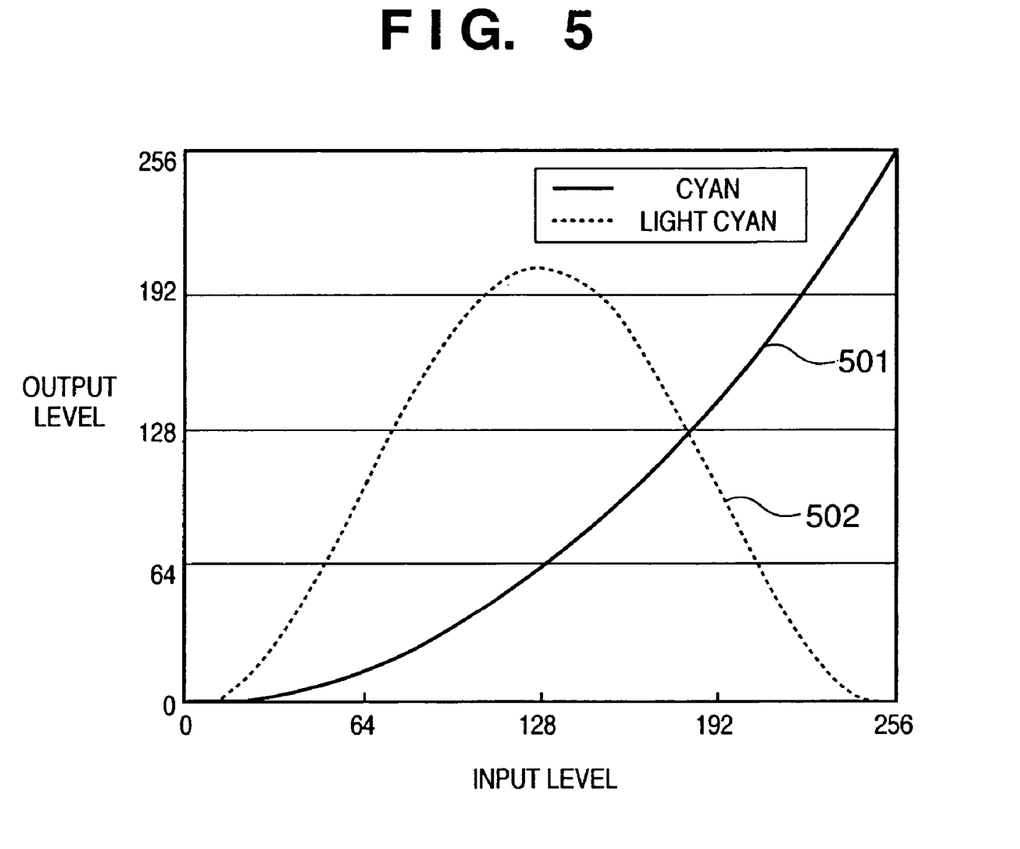
FIG. 5 is a graph showing an example of dark→dark and light color separation.

FIG. 4 shows an example of input signal-density value characteristics of dark and light toner. FIG. 4 shows the characteristics of cyan and light cyan, but regarding magenta and light magenta, similar characteristics are given. Numeral 401 denotes a density value to a cyan input signal level, and 402, a density value to a light cyan input signal level. As the light cyan and cyan are in this toner density relation, a typical example of color separation "C→C, LC" performed by the color separator 307 is as shown in FIG. 5. In FIG. 5, the horizontal axis indicates an input cyan signal level, and the vertical axis, an (light cyan and cyan) output signal level. As denoted by 502, the light cyan output level is high in a low density portion, and the cyan output level is increased in a higher density portion. The light cyan output level is attenuated from an intermediate density portion to a high density portion so as to keep a limited toner amount. In the above, color separation regarding cyan and light cyan has been described, but similar color separation is performed regarding magenta and light magenta.

Figure 6:
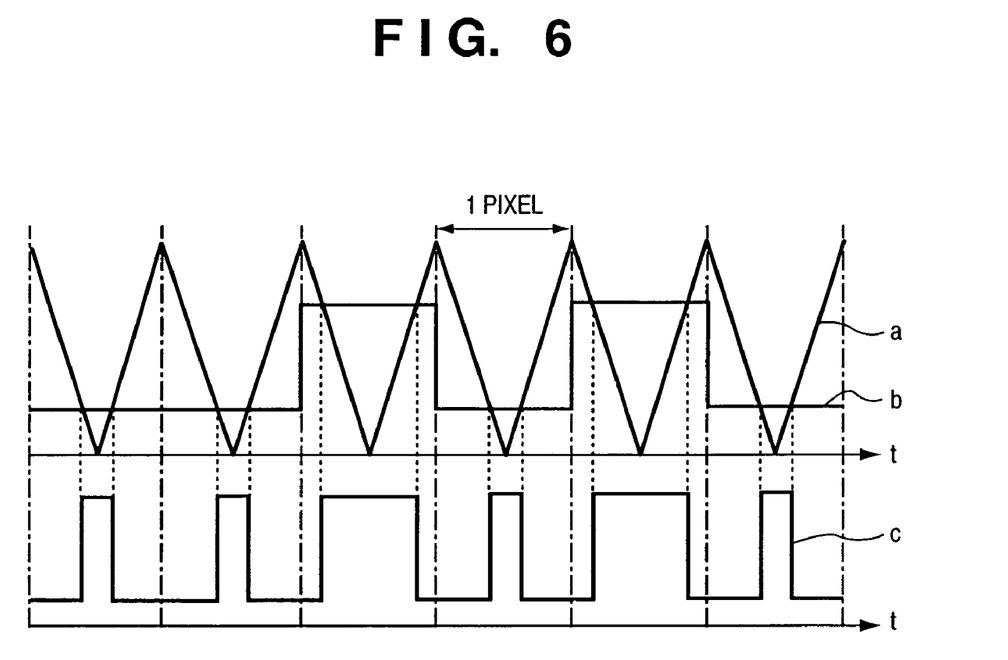
FIG. 6 is an explanatory view of the conception of PWM.

Next, a gradation representation method in the printer 100 will be described with reference to FIG. 6. The image forming apparatus according to the present embodiment has a 600 dpi resolution in main scanning and subscanning and has 256-level gradation representation performance per each pixel by pulse width modulation (PWM). FIG. 6 shows the outline of the gradation representation method. When a saw tooth wave a is generated in a cycle of 1 pixel and threshold value processing is performed with a rectangular wave b in the 1-pixel cycle corresponding to respective pixel level, a rectangular wave c having a width corresponding to each pixel level is obtained. The 8-bit gradation representation is performed by using the width. In the printer 100, laser is emitted in correspondence with High level of the rectangular wave c, thereby a predetermined sized dot is formed on the surface of the photosensitive drum 1a or 1b.

<Construction of Smoothing Processor>

Figure 7A:
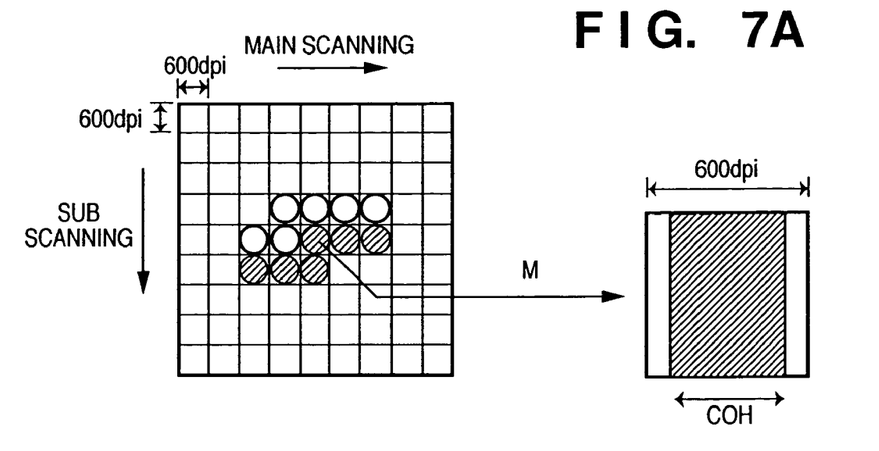
FIGS. 7A to 7C are explanatory vies of an edge smoothing technique.
Figure 7B:
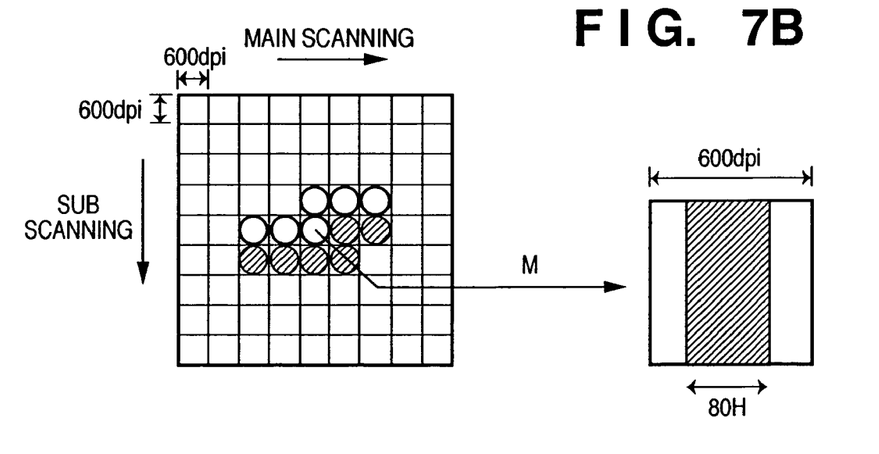
Figure 7C:
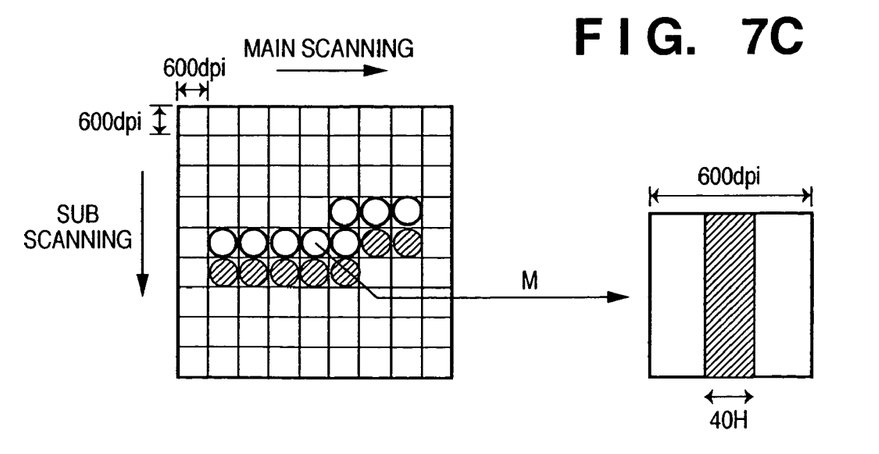

According to the edge smoothing technique disclosed in e.g. Japanese Patent Application Laid-Open No. 08-317210, pattern matching is performed between an input image and previously registered feature detection patterns. If there is a match, pixel replacement is performed for edge smoothing. FIGS. 7A to 7C show examples of such feature detection patterns. In FIGS. 7A to 7C, the feature detection pattern is a 9×9 bitmap having a central pixel as a pixel of interest (M). Each grid mesh indicates a 600 dpi pixel. "○" indicates that the pixel is a white dot (=00H) and "●" indicates that the pixel is a black dot (=FFH). The other pixels may be black dots, white dots, or halftone dots.

For example, in an input image corresponding to the pattern in FIG. 7A, it is determined that the pixel of interest M is a part of approximately horizontal diagonal line and is a change point in a high density portion. As a result, the pixel of interest M (FFH) is replaced with "C0H". Next, in an input image corresponding to the pattern in FIG. 7B, it is determined that the pixel of interest M is a part of approximately horizontal diagonal line and is a change point in a low density portion. As a result, the pixel of interest M (FFH) is replaced with "80H". Further, in an input image according to the pattern in FIG. 7C, as the pixel of interest M is a part of approximately horizontal diagonal line and is 1-dot away from a change point, the pixel of interest M is replaced with "40H". As a result, in an upper side edge of approximately horizontal diagonal line in the pattern-matched input image, pixel replacement is performed in 3 pixels, thus the edge is smoothed.

The correspondence between such feature detection pattern and pixel value upon determination of pattern match is stored in a storage device (memory 204) such as a ROM, and the processing on a pixel of interest is repeated, thereby edge smoothing effect can be produced. The patterns shown in FIGS. 7A to 7C are merely examples, and to detect various pattern edge features as disclosed in Japanese Patent Application Laid-Open Nos. 08-317210 and 10-42141, a large number of feature detection patterns must be held. For the sake of simplification of explanation, those patterns will not be given here.

Figure 8:
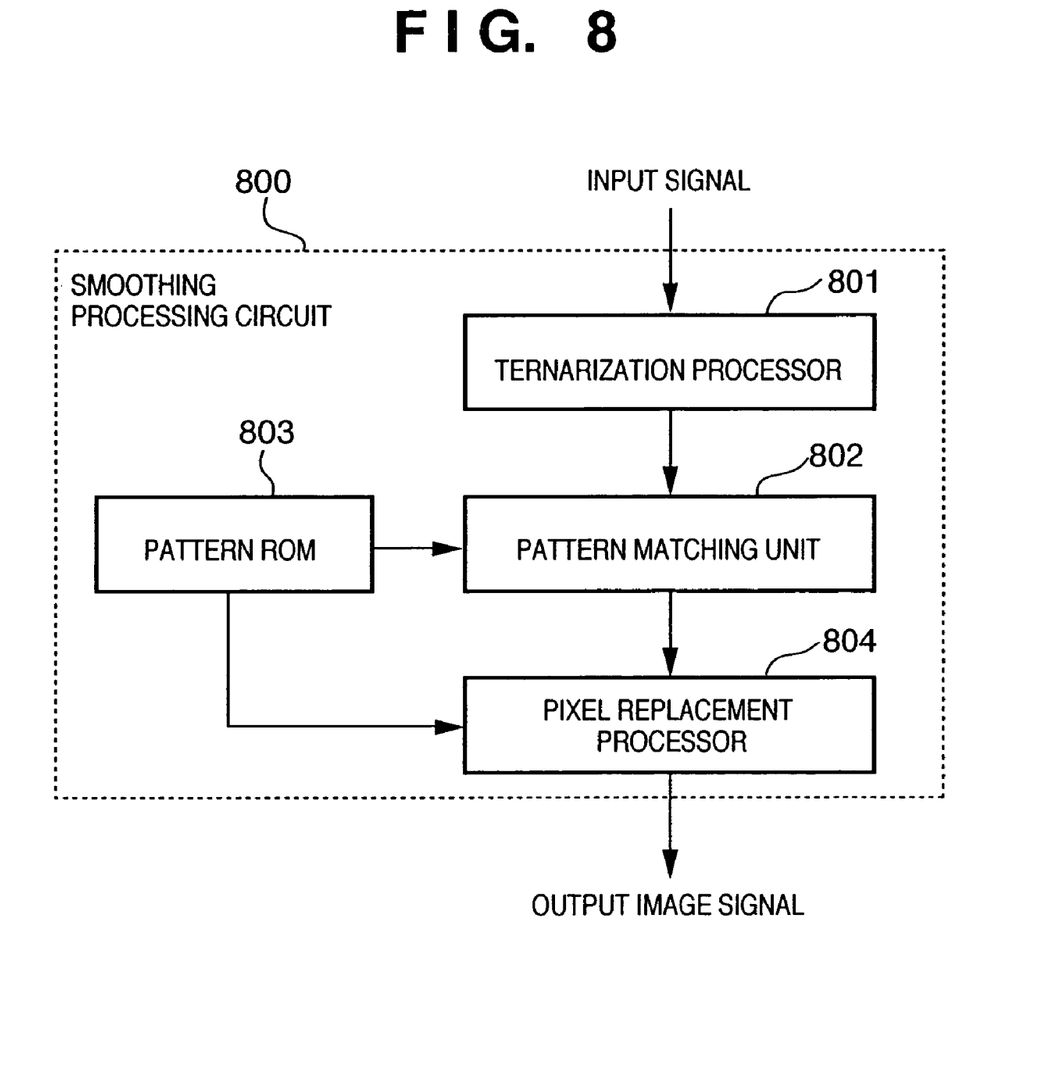
FIG. 8 is a block diagram showing the construction of a smoothing processing circuit according to the first embodiment.

FIG. 8 is a block diagram showing the construction of a smoothing processing circuit constructing the smoothing processor 308. The smoothing processing by the smoothing processor 308 is performed by a smoothing processing circuit 800. The smoothing processing circuit 800 has a ternarization processor 801 which performs threshold value processing on an input image to classify pixels to FFH, 00H and other values, a pattern ROM 803 which holds the correspondence between feature detection patterns in FIGS. 7A to 7C and replaced pixel values, a pattern matching unit 802 which performs pattern matching between the ternarized image signal and the feature detection patterns supplied from the pattern ROM 803, and a pixel replacement processor 804 which performs pixel replacement upon determination of pattern match. Note that as long as the ternarization processor 801 generates black and white dots, it may perform binarization processing. Further, as the matching processing performed by the pattern matching processor 802, as mask processing, product-sum operation is performed between the input ternary image signal and the feature detection pattern, and in a case where the obtained value exceeds a predetermined threshold value, it is determined that the input image matches the pattern.

Figure 9:
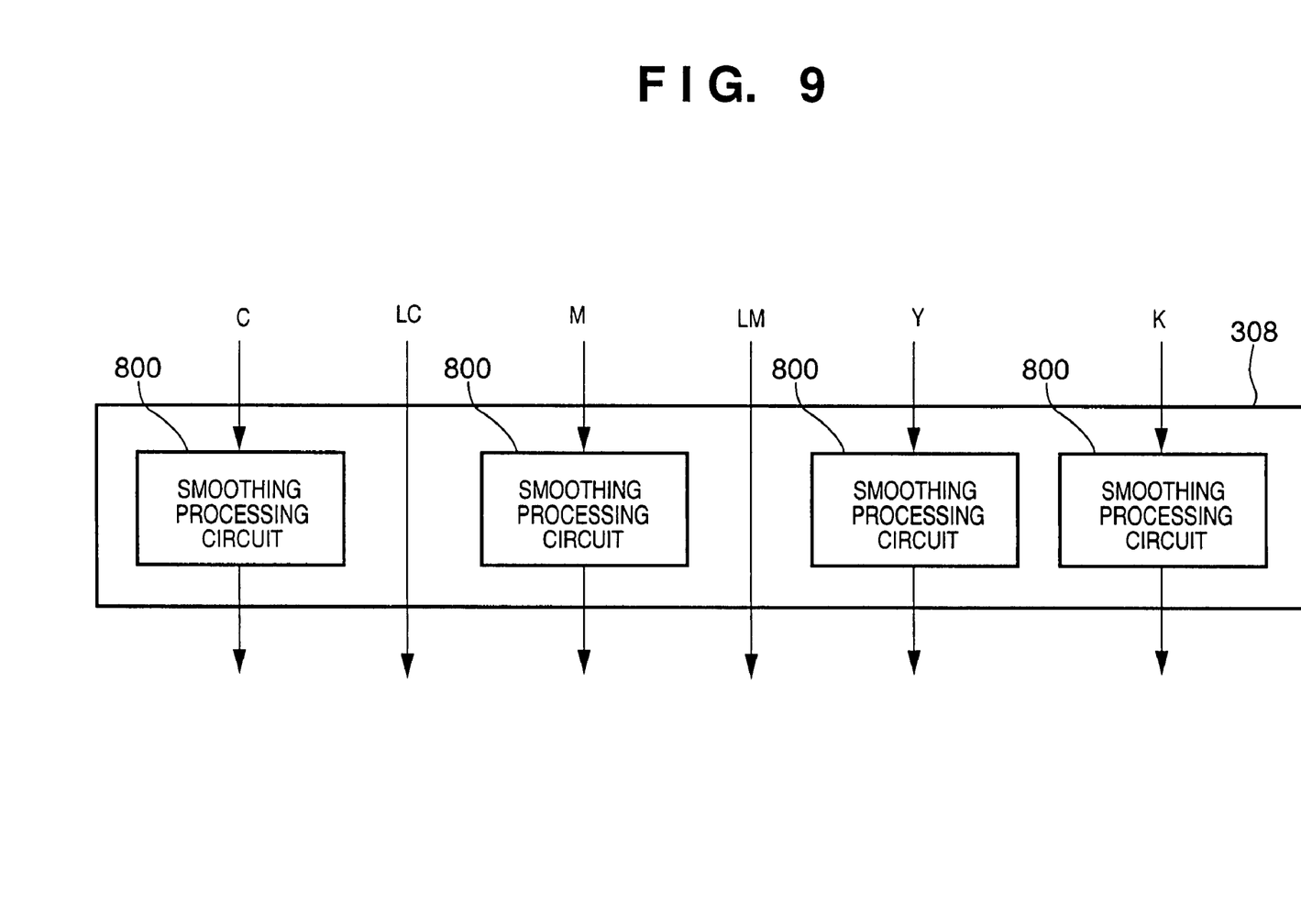
FIG. 9 is a block diagram showing the construction of a smoothing processor according to the first embodiment.

In the smoothing processor 308, the smoothing processing circuit 800 having the above construction is not provided for the respective 6 color components, C, L, M, LM, Y and K, but is provided only for C, M, Y and K color components as shown in FIG. 9. That is, the LC and LM color components are transmitted to the printer 100 without smoothing processing. As shown in FIG. 4, regarding the LC and LM color components, the output density is about 40% of the C and M color component to a maximum input signal level, and almost no edge appears in the LC and LM signals in an image.

When the edge smoothing technique is used in the image forming apparatus having the above construction which uses dark and light toner, the increase in the number of smoothing processing circuits in correspondence with the increase in the number of color components can be prevented, thus the increase in costs can be suppressed. Further, as the smoothing processing is not performed for light color image signals while the smoothing processing is performed for other color component image signals, the smoothing effect can be excellently maintained.

As described above, according to the first embodiment, in a case where the edge smoothing technique is applied to an image forming apparatus using dark and light recording materials (ink/toner or the like), the circuit scale can be reduced by omitting a smoothing circuit for a light color signal. Thus, an image with conventional edge smoothing effect can be outputted at a low cost. Note that from the view point of reduction of the number of smoothing circuits, smoothing may be performed on CMYK color components prior to the dark-and-light color separation. In this case, the smoothing processor 308 in FIG. 3 is arranged in the subsequent stage to the output processor 305 or the gamma corrector 306. Note that in the case of smoothing on data after the dark-and-light color separation as described in FIG. 3, the edge smoothing is performed on signals closer to output signals to the printer (printer engine) in comparison with the smoothing on the YMCK color signals. Accordingly, unnaturalness caused by color separation of halftone dots formed by the smoothing processing is prevented.

Second Embodiment

In the above-described first embodiment, in a case where pixel replacement occurs in the smoothing processing circuit 800, the pixel value is replaced with an intermediate value (in FIGS. 7A to 7C, FFH→C0H, 00H→80H, 00H→40H). In the first embodiment, upon occurrence of pixel replacement, no interaction occurs among the color components. The pixel is replaced using an intermediate value of dark recording material, and image formation is performed. However, especially in an electrophotographic printer, dot formation of halftone dot becomes unstable as the signal level is lowered. Accordingly, in the second embodiment, the dot formation of pixel-replaced signal is stabilized by further replacing the pixel-replaced signal, generated by the smoothing on image signal corresponding to dark recording material, with an image signal for image formation using a combination of dark recording material and light recording material. That is, a halftone signal, newly generated by edge smoothing on an image signal corresponding to a dark recording material, is converted to an image signal for printing using a combination of dark and light recording materials or using light color material.

Figure 10:
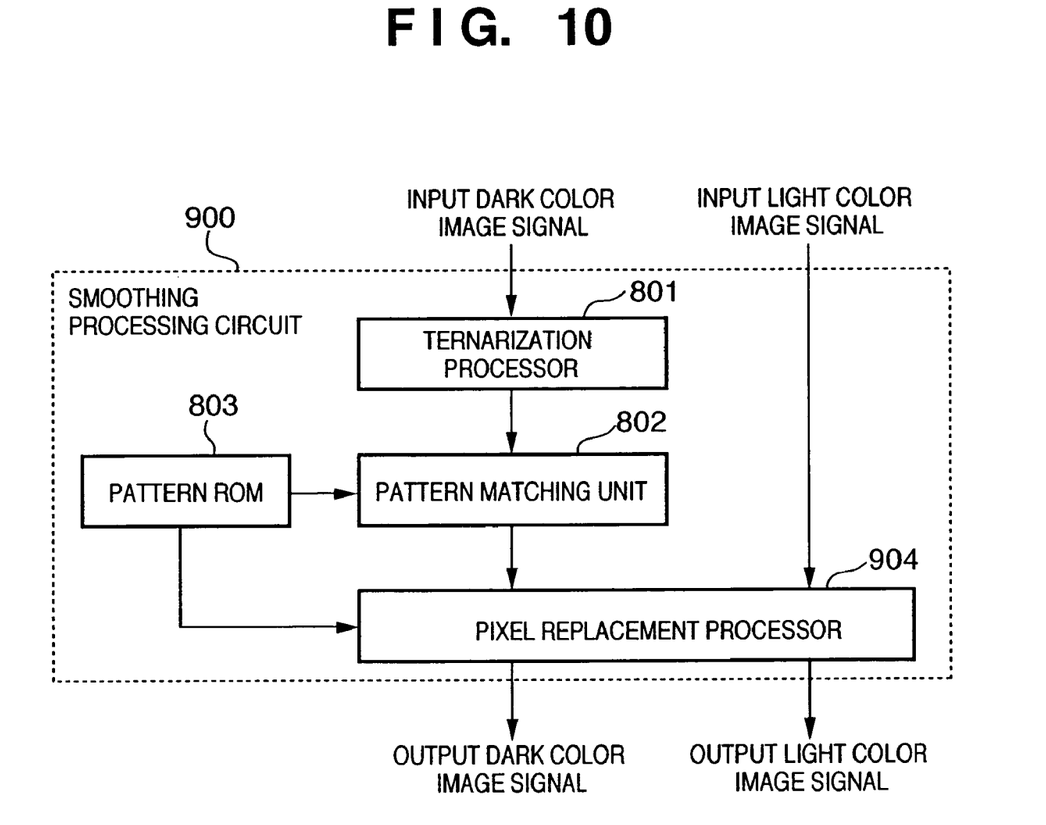
FIG. 10 is a block diagram showing the construction of a smoothing processing circuit according to a second embodiment.
Figure 11:
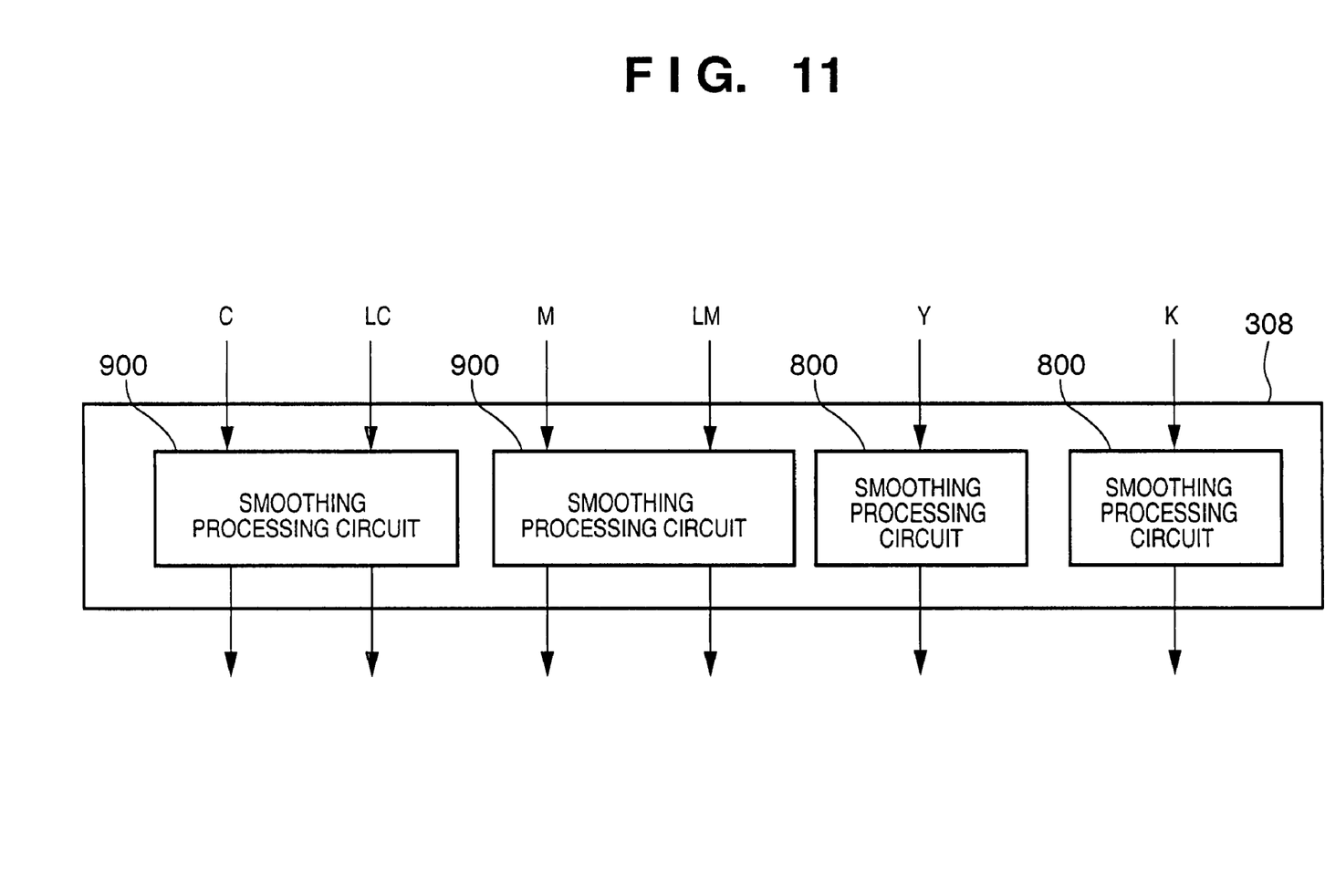
FIG. 11 is a block diagram showing the construction of the smoothing processor according to the second embodiment.

In the second embodiment, a smoothing processing circuit 900 constructing the smoothing processor 308 has a construction as shown in FIG. 10, and the smoothing processor 308 has a construction as shown in FIG. 11.

FIG. 10 is a block diagram showing the construction of the smoothing processing circuit according to the second embodiment. The smoothing processing circuit 900 according to the second embodiment inputs cyan and light cyan image input signals or magenta and light magenta image input signals (hereinbelow, cyan and magenta signals will be generally referred to as a "dark color image signal", and light cyan and light magenta signals will be generally referred to as a "light color image signal"). A dark color image signal is ternarized by the ternarization processor 801 as in the case of the smoothing processing circuit 800 in the first embodiment, and subjected to matching with the patterns stored in the pattern ROM 803 by the pattern matching unit 802, then inputted into a pixel replacement processor 904. In the smoothing processing circuit 900 in the second embodiment, the pixel replacement processor 904 inputs a light color image signal as well as the dark color image signal and performs pixel replacement.

In pixel replacement, the dark→dark and light color separation in the color separator 307 can be performed. For example, in a case where regarding cyan, replacement signals C0H (=192), 80H (=128) and 40H (=64) are obtained in the pixel replacement processor 904, and the respective dark color image signals are converted by the dark→dark and light color separation shown in FIG. 5 as follows.

| dark signal | → | dark signal | + | light signal |
|---|---|---|---|---|
| 192 | | 140 | | 90 |
| 128 | | 64 | | 200 |
| 64 | | 10 | | 100 |

In this manner, the pixel value of the pixel of interest M is replaced in both dark color signal and light color signal. The light color signal generated by the above processing is added to an input light color image signal as an output light color image signal.

The dark→dark and light color separation is realized by providing a one-dimensional LUT converter in the pixel replacement processor 904. For example, pixel formation using a signal value (light signal=100), generated by replacement of signal value 64 in a low density portion of a dark color signal with a combination of dark and light color signals, can be made by using the above processing, thereby the dot formation can be further stabilized.

Note that it may be arranged such that, in a case where a dark color signal having a value "160" (corresponding to density 0.6 in FIG. 4) or less, equivalent to the density of light color signal FFH, is outputted as a pixel replacement signal, a replacement signal is generated to replace the pixel to a pixel value of only light color value. For example, it may be arranged such that in the conversion, dark color signal values 0 to 160 are uniformly allocated to light color signal values 0 to 255.

In this processing, a density area of a dark color signal where dot formation is unstable can be replaced with a light color signal for image formation with greater signal value. Thus, the stability of halftone dot for smoothing of pixel peripheral portion can be improved.

Note that in the present embodiment, the color signals separated to dark and light signals are cyan and magenta signals, however, black and yellow signals can be similarly separated to dark and light color signals and subjected to processing by a similar smoothing circuit. Such construction is applicable to an image forming apparatus using a further increased number of developers. In the image forming apparatus, when one developer is added, as the number of developers is 7, three developers and four developers are respectively provided in the two developing rotaries. Further, when two developers are added, respectively four developers are provided in the two developing rotaries.

Especially, regarding black, if image formation is performed with application of a smoothing circuit using dark and light color signals, excellent smoothing effect can be obtained in black characters and thin lines. Thus a document image output with high smoothing effect can be obtained from matching with image patterns frequently used in general documents. That is, the present invention is effectively applicable to a monochrome output image forming apparatus.

As described above, according to the second embodiment, as a halftone dot which has been rather unstable in the conventional edge smoothing technique can be replaced with a light color signal having higher intensity (larger dot), the stability of edge halftone density portion can be improved, and an image with higher edge smoothing effect can be outputted.

Note that in the second embodiment, the edge smoothing processing is performed only on a dark color image signal. However, from the view point of stable dot formation, the construction of the second embodiment is applicable to a construction where the edge smoothing processing is performed on all the dark and light color image signals. That is, it may be arranged such that in FIG. 10, the input light color image signal is also processed by the ternarization processor 801 and the pattern matching unit 802, and the result is supplied to the pixel replacement processor 904.

In the first and second embodiments, the PWM method is used as a gradation representation method. The gradation representation is similarly applicable to a printer having 2 to less than 8 bit gradation representation. In this case, it may be arranged such that a pseudo halftone representation method such as the dither or error distribution is employed, and smoothing processing is performed on a pseudo-halftone represented image signal.

Further, in the above respective embodiments, an electrophotographic printer has been described as an example of the image forming apparatus, however, an ink-jet printer which performs image formation using dark and light ink can also be employed in output processing using the edge smoothing unit.

As described above, according to the first embodiment, the cost reduction can be realized while edge smoothing effect can be maintained. Further, according to the second embodiment, a halftone dot generated by the edge smoothing processing can be formed in a more stable manner, thus the image quality can be improved.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-093161 filed on Mar. 26, 2004, which is incorporated by reference herein.

What is claimed is:

1. An image forming apparatus comprising:
an image forming unit configured to perform image formation using plural color materials including dark color material and light color material for a hue;
a generation unit configured to generate color component signals corresponding to the respective plural color materials from an input image signal;
a smoothing unit configured to detect an edge portion for the color component signal corresponding to the dark color material from the color component signals generated by the generation unit, while detecting an edge portion for the color component signal corresponding to the light color material is not performed, and to perform smoothing processing which replaces the pixel signals at the detected edge portion and an adjacent portion with a halftone color component signal corresponding to the dark color material;
a conversion unit configured to convert a halftone color component signal, generated by the smoothing processing on the color component signal corresponding to the dark color material, into a combination of the color component signal corresponding to the dark color material and the color component signal corresponding to the light color material for a hue of the dark color, while color component signals corresponding to the dark color material on which the smoothing processing has not been performed are not converted into the combination; and
an addition unit configured to add the color component signal corresponding to the light color material obtained from the conversion by the conversion unit to the color component signal corresponding to the light color material generated by the generation unit.

2. The apparatus according to claim 1, wherein the conversion unit converts the halftone color component signal generated by the smoothing processing of the color component signal corresponding to the dark color material into color component signals corresponding to the dark color material and the light color material for a hue of the dark color material; and
the apparatus further comprising a transmission unit which transmits, to a printer unit, the color component signal corresponding to the light color material obtained from the addition by the addition unit and the color component signal corresponding to the dark color material obtained from the conversion unit.

3. An image forming method for an image forming apparatus, comprising:
an image forming step in which an image forming unit performs image formation using plural color materials including dark color material and light color material for a hue;
a generation step in which a generation unit generates color component signals corresponding to the respective plural color materials from an input image signal;
a smoothing step in which a smoothing unit detects an edge portion for the color component signal corresponding to the dark color material from the color component signals generated in the generation step, while detecting an edge portion for the color component signal corresponding to the light color material is not performed, and performs smoothing processing which replaces the pixel signals at the detected edge portion and an adjacent portion with a halftone color component signal corresponding to the dark color material;
a conversion step in which a conversion unit converts a halftone color component signal, generated by the smoothing processing on the color component signal corresponding to the dark color material, into a combination of the color component signal corresponding to the dark color material and the color component signal corresponding to the light color material for a hue of the dark color, while color component signals corresponding to the dark color material on which the smoothing processing has not been performed are not converted into the combination; and
an addition step in which an addition unit adds the color component signal corresponding to the light color material obtained from the conversion in the conversion step to the color component signal corresponding to the light color material generated in the generation step.

4. The method according to claim 3, wherein the conversion step includes converting the halftone color component signal generated by the smoothing processing of the color component signal corresponding to the dark color material into color component signals corresponding to the dark color material and the light color material for a hue of the dark color material; and the method further comprising a transmission step of transmitting to a printer unit the color component signal corresponding to the light color material obtained from the addition in the addition step and the color component signal corresponding to the dark color material obtained in the conversion step.

5. A computer-readable recording medium storing a program that makes a computer perform the image forming method of claim 3.

\* \* \* \* \*